(12) United States Patent
Rowden et al.

(10) Patent No.: US 10,171,468 B2
(45) Date of Patent: Jan. 1, 2019

(54) SELECTIVE PROCESSING OF APPLICATION PERMISSIONS

(71) Applicant: International Business Machines Corporation, Armonk, NY (US)

(72) Inventors: Michael R. Rowden, Cedar Park, TX (US); Andrei V. C. Ta, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/244,149

(22) Filed: Aug. 23, 2016

(65) Prior Publication Data

US 2018/0063138 A1    Mar. 1, 2018

(51) Int. Cl.
*G06F 21/00* (2013.01)
*H04L 29/06* (2006.01)

(52) U.S. Cl.
CPC .............. *H04L 63/10* (2013.01); *G06F 21/00* (2013.01)

(58) Field of Classification Search
CPC ................................. H04L 63/10; G06F 21/00
See application file for complete search history.

(56) References Cited

U.S. PATENT DOCUMENTS

| | | | |
|---|---|---|---|
| 7,712,126 B2 | 5/2010 | Anderson et al. | |
| 8,627,484 B2 | 1/2014 | Beckley et al. | |
| 8,763,115 B2 | 6/2014 | Budko et al. | |
| 8,819,850 B2 | 8/2014 | Chien | |
| 2008/0244685 A1 | 10/2008 | Andersson et al. | |
| 2013/0322448 A1* | 12/2013 | Vihtari et al. | H04L 45/304 370/392 |
| 2014/0283132 A1* | 9/2014 | Kenna | G06F 21/62 726/29 |
| 2015/0067880 A1 | 3/2015 | Ward et al. | |
| 2015/0074165 A1 | 3/2015 | Rahardja et al. | |
| 2015/0235043 A1* | 8/2015 | Haik | G06F 21/6218 726/27 |
| 2016/0048695 A1* | 2/2016 | Cucinotta | G06F 21/51 726/27 |

* cited by examiner

*Primary Examiner* — Tri M Tran
(74) *Attorney, Agent, or Firm* — Schmeiser, Olsen & Watts, LLP; Maeve Carpenter

(57) ABSTRACT

An application permissions processing system and method for processing application permission requests is provided. The method includes the steps of detecting that an application has been downloaded to a computing system, receiving one or more permission requests from the application for resources located on the computing system, determining that at least one of the one or more permission requests is a required permission of the application, prompting the user to decide the one or more permission requests, receiving a denial of the required permission from the user, in response to the prompting, and responding to the application by providing spoofed resources to the application to satisfy the required permission of the application.

17 Claims, 5 Drawing Sheets

SELECTIVE PROCESSING OF APPLICATION PERMISSIONS

TECHNICAL FIELD

The present invention relates to systems and methods of a selective processing system for application permissions, and more specifically to embodiments of a selective processing system and method that selectively allows an application access to user data and device hardware.

BACKGROUND

When a user downloads an application to a mobile computing device, the user is required to approve or deny requests by the application for permission to access user data and device hardware. Access to the user data or device hardware is often required for the application to function on the user's mobile computing device. However, the user may not want to provide the application with access to required user data or device hardware, but wants to use the application.

SUMMARY

An embodiment of the present invention relates to a method, and associated computer system and computer program product, for processing application permission requests. A processor of a computing system detects that an application has been downloaded to the computing system. One or more permission requests for resources located on the computing system are received, and the processor determines that at least one of the permission requests is a required permission of the application. The user is prompted to decide the requests, when a denial of a required permission is received, the processor responds to the request from the application by providing simulated resources to the application to satisfy the required permission.

DETAILED DESCRIPTION

Applications downloaded onto a user's mobile device often request permission for resources, such as user data and device hardware located on the user's mobile device, to optimally function. In some cases, permission can be denied by the user, and the application will still function on the user's device as intended. In other cases, applications require the resources, or access thereto, to function on the user's device, and if denied, the application will not completely function, or will function with limited features. Users typically deny the required permission for user data and/or device hardware when the permissions pertain to personal information, location data, and similarly private data. Currently, the user must choose between allowing an application to obtain personal user-related information and not using the application on the user's device.

Thus, a need exists for a system for selectively processing application permission requests wherein the user can benefit from the application but also deny permissions to obtain certain, user-related information.

Figure 1:
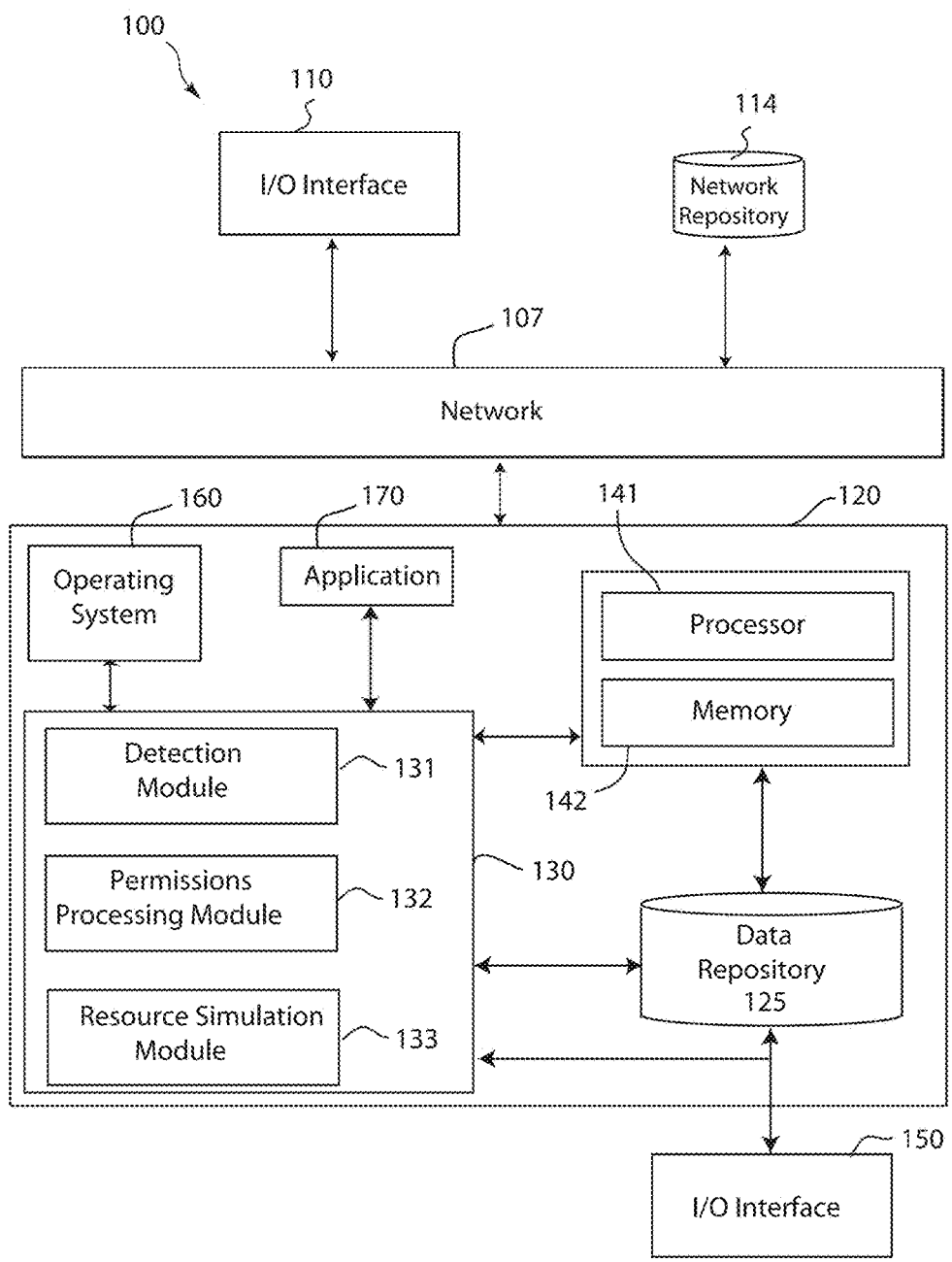
FIG. 1 depicts a block diagram of an application permissions processing system, in accordance with embodiments of the present invention.

Referring to the drawings, FIG. 1 depicts a block diagram of an application permissions processing system, in accordance with embodiments of the present invention. Embodiments of a selective application permissions processing system 100 may run on a user computing device, such as a mobile phone, and may detect when an application is downloaded onto the user computing device. The selective application permissions processing system 100 may receive one or more requests from the application seeking permission to obtain user data and controls for controlling device hardware. The selective application permissions processing system 100 may override the application's API's intended for the operating system of the user computing device so that the requests are received by the selective application permissions processing system 100. Once the one or more permissions are received, the user is prompted to choose which permission requests to grant or deny; each individual permission request may be displayed on the user computing device. The user selects which permission requests to accept or deny, as described in greater detail irfra. If any of the denied permissions are required by the application to function and/or complete installation onto the user computing device, the system 100 may provide simulated or spoofed resources, such as data/information stored on the computing system 100, to satisfy the application's required permission. The functions performed by the selective application permissions processing system 100 are performed without the application knowing that responses returned to the application are provided by the application permissions processing system 100 so the application accepts the simulated data as valid, genuine data. Therefore, a user can deny permission to obtain personal user data, while satisfying a required permission to obtain resources of the computing system 120 so that the application will still install onto the user computing device.

Embodiment of selective application permissions processing system 100 may comprise one or more input/output interfaces, I/O device 110, 150 coupled to a computing system 120 either directly and/or over a network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

An I/O interface 110, 150 may enable any communication process performed between the computer system 120 and the environment outside of the computer system 120. Input to the computing system 120 may enable the signals or instructions sent to the computing system 120, for example information provided by the user relating to allow, granting, or simulating application permissions, while output may enable the signals sent out from the computer system 120.

In some embodiments, the network 107 may further comprise, in addition to the computer system 120, a connection to one or more network accessible knowledge bases containing information of the user, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging user preferences on permissions allowed, granted, and/or simulated to generate both historical and predictive reports regarding a particular user, or to implement an automatic user response to an application's request to obtain a particular type of data. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may receive user selections regarding permissions requested by the application invitee data via I/O interfaces 110, 150. Input devices or input mechanisms associated with the I/O interfaces 110, 150 may be a touchscreen of a mobile device, so that the user is prompted to respond to one more permission requests directly on the user mobile device, and may respond by directly interacting with the user mobile device. Other inputs may be used to collect user selection, such as one or more connected microphones positioned nearby the user or a built-in microphone of the user's mobile device to allow voice-commands, a keyboard, a webcam, mouse, touchpad, stylus, and the like, or other peripheral devices connected to the computing system 120 over the network 7 or via Bluetooth, IR, or other short range communication networks.

Embodiments of the computer system 120 may be equipped with a memory device 142 which may store the user selections, and a processor 141 for implementing the tasks associated with the selective application permission processing system 100. The computing system 120 may further include an operating system 160, which can be a computer program for controlling an operation of the computing system 120, wherein applications loaded onto the computing device 120 may run on top of the operating system 160 to provide various functions.

Furthermore, embodiments of computer system 120 may include a gateway interface 130. The gateway interface 130 may include a detection module 131, a permissions processing module 132, and a resource simulation module 133. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the detection module 131 may include one or more components of hardware and/or software program code detecting whether an application 170 has been downloaded onto the computing system 120. Application 170 may be a software application, such as a sandbox application, downloadable over a network to the computing device 120. Embodiments of application 170 may include any number of software such as web browsers, text editors, photo editors, games, social networking applications, messaging applications, telephone applications, email applications, map applications, productivity applications, and combinations thereof. Additionally, the application 170 can provide functionality associated with other applications by obtaining data from remote devices or services. The detection module 131 may detect whether a new application 170 has been downloaded on the computing system 120 so that the gateway interface 130 steps between the operating system 160 and the application 170. A data exchange may then occur between the gateway interface 130 and the application 170, wherein API's of the application 170 to the operating system 160 are overridden and/or intercepted by the gateway interface 130. Because the application 170 sends out blind requests for permissions, the application 170 is not aware that the data in response to the requests are coming from the gateway interface 130, and not the operating system 160 of the computing system 120. The detection module 131 may be responsible for detecting the application 170 and establishing a data exchange therebetween, intercepting or preventing a data exchange between the application 170 and the operating system 160. Thus, the functions of the gateway interface 130 may be unknown to the application 170, and the application 170 will accept simulated, spoofed information as valid, genuine information/data provided in response to application's 170 request for one or more permissions to obtain user data and/or device hardware.

With continued reference to FIG. 1, embodiments of the computing system 120 may further include a permissions processing module 132. Embodiments of the permissions processing module 132 may include one or more components of hardware and/or software program code for receiving a request for one or more permission requests from the application 170 detected by the detection module 131, and prompting the user to respond to the one or more permission requests from the application 170. Once the downloaded application 170 is detected by the detection module 131 and a data exchange between the application 170 and the gateway interface 130 is established, the permissions processing module 132 may receive a request from the application 170 for one or more permissions to receive, obtain, or access resources located on the computing system 120, such as user data and/or device hardware. The application 170 may request permission to obtain, receive, and/or access user data or data stored on the user's mobile computing device, such as location data (GPS coordinates), photographs, messages, application data, web browsing history, contacts, Wi-Fi access, or combinations thereof. The requested resources may be viewed as personal or intrusive to the user. Further, the application 170 may request permission to obtain and/or access device hardware functionality and control, such as the camera and microphone of the user's mobile computing device.

The permissions processing module 132 may identify and organize the one or more permission requests received from the application 170 and prompt the user to choose whether to grant/allow or deny/refuse each permission request of the one or more permission requests. In an exemplary embodiment, the permissions processing module 132 may prompt the user by displaying the one or more permission requests on a display of the user's mobile computing device. All of the permission requests may be displayed as a list on a single page, or may be presented one at a time, advancing to the next permission request once the user makes a selection. The user may communicate the user's selection to the computing system 120 by interacting with a user interface (UI), such as touchscreen of the user's computing device, or by interacting with another input mechanism via I/O interface 110, 150. The user may operate one or more UI controls to indicate the user's selection of whether to allow or deny permission for a particular user-related data or device hardware. In some embodiments, the selection may require touching a yes/no icon, or checking/placing an "X" next to "deny," or "allow." Other words may be used to represent an acceptance, allowance, granting, denial, refusal, and the like, of a particular permission request. If the user allows a particular permission request, then the permissions processing module 132 may respond to the request by either authorizing access to the allowed data, providing or supplying the data or an address of the requested resource to the application 170, or may both authorize access and provide the data or address. If the user denies access to a particular permission request, then the permissions processing module 132 may respond to the request by denying the request for resources and/or access to the resources requested, unless the particular denied permission is a required permission of the application 170.

As part of the identifying and organizing the one or more permission requests received from the application 170 by the permissions processing module 132, or as a separate task, the permissions processing module 132 may determine that at least one of the one or more permission requests are a required permission by the application 170. For example, the permissions processing module 132 may determine from the application 170 that a particular permission request for resources is required for the application 170 to function, or the application 170 cannot be used by the user. Thus, the permissions processing module 132 may not communicate the denial to the application 170, but rather allow the resource simulation module 133 to provide simulated, spoofed resources to satisfy the required permission request of the application 170.

In alternative embodiments, the permissions processing module 132 may identify and organize the one or more permission requests received from the application 170 and prompt the user to choose whether to grant/allow access to each permission request of the one or more permission requests, or simulate spoofed resources for permission requests that the user would otherwise deny. In this embodiment, the user may operate one or more UI controls to indicate the user's selection of whether to allow a permission request for a particular user-related data or device hardware, or simulate spoofed resources related to the request by the application 170. For example, the selection may require touching a yes/no icon, or checking/placing an "X" next to "allow," or "simulate." If the user allows a particular permission request, then the permissions processing module 132 may respond to the request by either authorizing access to the allowed data, or providing or supplying the resources or an address to the resources to the application 170, or may both authorize access and provide the resources. If the user chooses to simulate a response to a particular permission request, then the permissions processing module 132 may allow the data simulation module 133 to provide the simulated, spoofed resources to the application 170. By prompting the user to select between allowing or simulating, the user may be spared the step of having to first deny the permission because selecting to simulate the resources can be treated as a denial of a permission.

In further embodiments, the permissions processing module 132 may identify and organize the one or more permission requests received from the application 170 and prompt the user to choose whether to grant/allow or deny/refuse a permission request of the one or more permission requests, or simulate resources for a particular permission request. In this embodiment, the user may operate one or more UI controls to indicate the user's selection of whether to allow or deny permission for a particular user-related data or device hardware, or simulate resources related to the request by the application 170. For example, the selection may require touching a yes/no icon, or checking/placing an "X" next to "allow," "deny," or "simulate." If the user allows a particular permission request, then the permissions processing module 132 may respond to the request by either authorizing access to the allowed data, providing or supplying the resources or an address to the resources to the application 170, or may both authorize access and provide the resources. If the user denies access to a particular permission request, then the permissions processing module 132 may respond to the request by denying access to the data requested, unless the particular denied permission is a required permission of the application 170. If the user chooses to simulate a response to a particular permission request, then the permissions processing module 132 may allow the resource simulation module 133 to provide the simulated, spoofed resources to the application 170. By prompting the user to select between allowing, denying, or simulating, the user can still deny a permission that is not required without having to send simulated, spoofed data that may affect a performance of the application 170 for a particular function of the application 170, yet also allow a user to simulate data at the initial prompt.

Referring still to FIG. 1, embodiments of the computing system 120 may further include a resource simulation module 133. Embodiments of the resource simulation module 133 may include one or more components of hardware and/or software program code for providing simulated, spoofed resources to the application 170 to satisfy a required permission of the application 170. If a denial is received from the user relating to one or more required permissions, then the resource simulation module 133 may provide simulated, spoofed resources to the application 170. The simulated, spoofed resources may be spoofed data, spoofed information, spoofed addresses, etc. that does not relate to the user, or may be generally inaccurate, or random. The simulated, spoofed resources may be applicable to the requested resources, such as GPS coordinates supplied in response to a request for location data of the user, wherein the GPS coordinates supplied by the resource simulation module 133 do not reflect the actual geolocation of the user or the user's computing device. Further, the resource simulation module 133 may automatically generate random spoofed resources (e.g. random GPS coordinates) or may allow the user to manually enter data via I/O interface 110, 150. In further embodiments, the resource simulation module 133 may store templates for simulating the spoofed resources for a particular type of data or device hardware. The templates may be user created templates, default system templates, or may be generated over time based on a learning algorithm that analyzes historical responses from the user, or based on data analyzed from the network repository 114. The simulated, spoofed resources provided by the resource simulation module 133 can be accepted as valid and/or genuine by the application 170 because the data exchange is between the gateway interface 130 and the application 170. Thus, a user may deny required permissions requested by the application 170, but still use the features/functions of the application 170 based on the provided spoofed resources, which are not personal or intrusive to the user.

In some embodiments, a user may wish to provide simulated, spoofed resources to the application 170 even if the permission request for resources is not a required permission of the application 170. For example, the user may decide to not allow any access to the application 170. The resource simulation module 133 may provide simulated, spoofed data upon request by the user if the user decides to "simulate" in response to being prompted by the permissions processing module 132.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention). Moreover, embodiments of the application permission processing system 100 may improve computer security technology, wherein computer resources are further protected from applications downloaded onto user devices. Processing application permission requests by the application permission processing system 100 may lead to a reduced risk of user data being obtained and potentially used for unlawful purposes, especially when a user can elect to have the system 100 transmit spoofed resources, such as non-genuine user data and device hardware control. In some embodiments, the application permission processing system 100 may be installed on government owned or company owned devices, wherein a predetermined default setting may be set by an authority or executive of the company to always spoof resources when requested by an application. Thus, computing devices used by employees can be secured by automatically spoofing resources if an application requests permission to access resources, wherein the application accepts the spoofed resources as valid, genuine resources.

Figure 2:
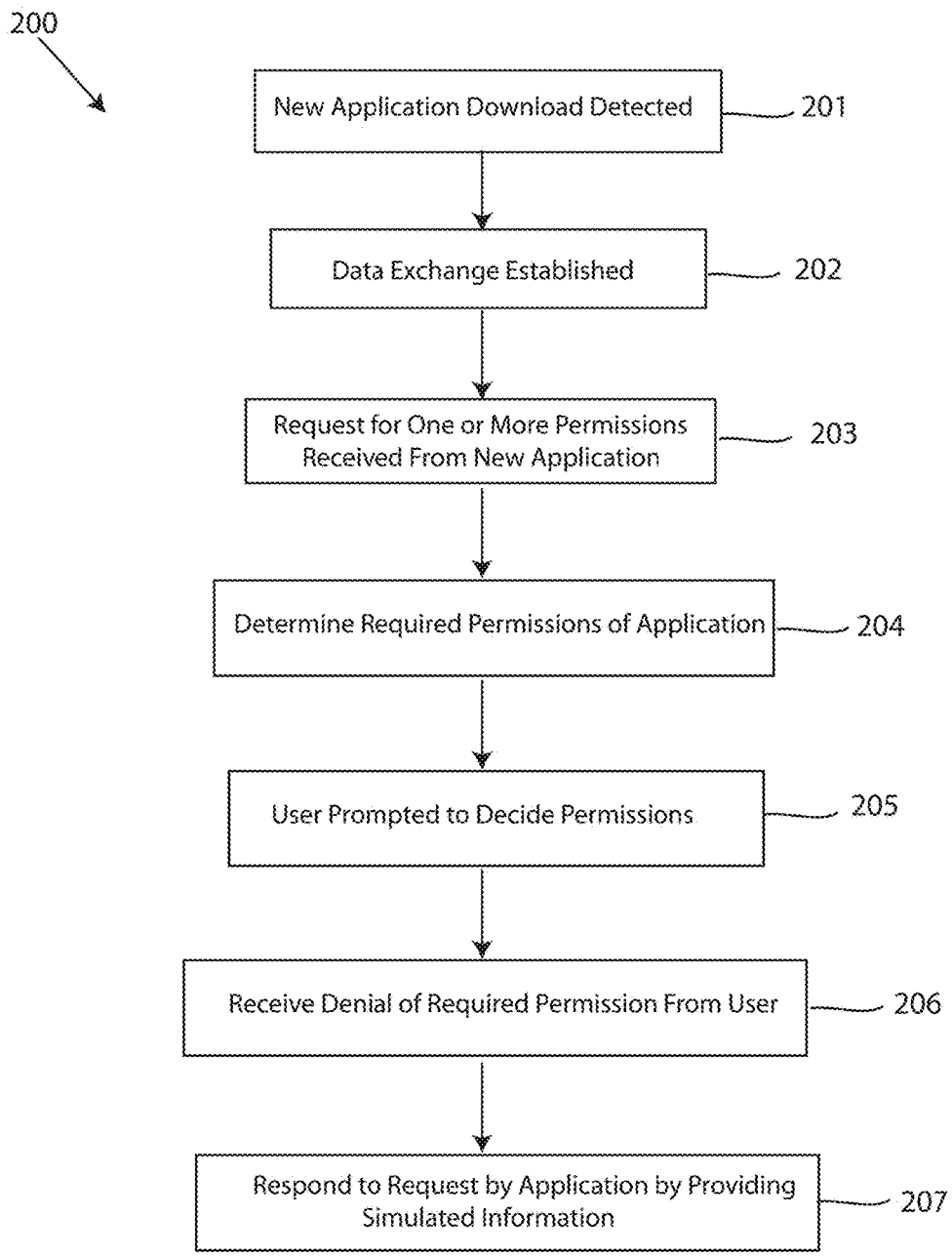
FIG. 2 depicts a flow chart of a method for selectively processing application permissions, in accordance with embodiments of the present invention.

Referring now to FIG. 2, which depicts a flow chart of a method 200 for selectively processing application permissions, in accordance with embodiments of the present invention. One embodiment of a method 200 or algorithm that may be implemented for selectively processing application permissions in accordance with the application permissions processing system 100 described in FIG. 1 using one or more computer systems as defined generically in FIG. 5 below, and more specifically by the specific embodiments of FIG. 1.

Embodiments of the method 200 for selectively processing application permissions, in accordance with embodiments of the present invention may begin at step 201 wherein a download of a new application 170 has been detected. Before the application 170 can communicate with the operating system 160, step 202 establishes a data exchange between the application 170 and the gateway interface 130 of the computing system 120 so that the gateway interface 130 receives requests, information, and data from the application 170, and sends responses, resources, information, and data back to the application 170. Step 203 receives a request for one or more permissions for resources located on the computing system 120, such as user data and/or device hardware, from the application 170. For instance, the application 170 may blindly send requests to the application permissions processing system 100 for permission to obtain, receive, and/or access resources, such as user data and/or device hardware, stored on a user device. The gateway interface 130 of the application permissions processing system 100 may receive the requests from the application 170 and step 204 determines that at least one of the one or more permission requests are required by the application 170. Step 205 prompts the user to decide the permission requests for a particular type of resource, including user data stored on the user device or device hardware, such as location data (GPS coordinates), photographs, messages, application data, web browsing history, contacts, Wi-Fi access, or combinations thereof, and device hardware functionality and control, such as the camera and microphone of the user's device. The user may decide to allow or deny each of the one or more permission requests. Step 206 receives a denial from the user of a required permission of the application 170. Because a required permission has been denied by user, step 207 responds to the permission requests by providing simulated, spoofed resources to satisfy the required permission. The simulated, spoofed resources may be spoofed data, device hardware, and addresses that do not relate to the user, or may be generally inaccurate or random, but accepted by the application as valid and/or genuine. The user may then use the application and all of the application's features.

Figure 3:
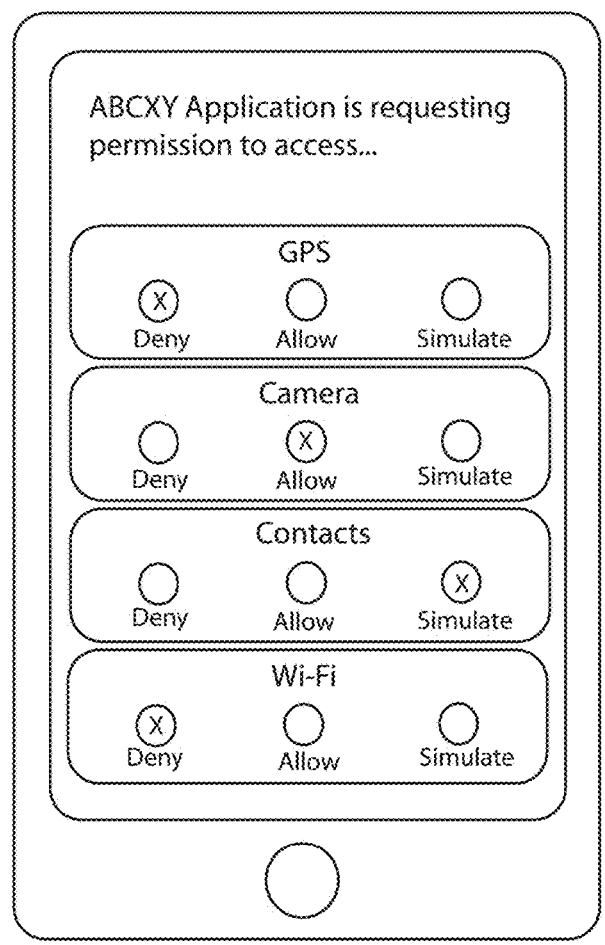
FIG. 3 depicts a user device displaying one or more requests for permission from an application, in accordance with embodiments of the present invention.

The following scenario is described for exemplary purposes to show an embodiment of the implementation of method 200:

A user downloads ABCXYZ Application, which is a mobile application that utilizes the user's current location data to suggest dinner ideas based on a lack of nearby restaurants serving that kind of food, providing detailed recipes so that the user can prepare a meal that the user would normally have to travel a far distance to enjoy. Once the ABCXYZ Application is downloaded onto the user's mobile device, the ABCXYZ Application requests permission to obtain the user's GPS, camera, contacts, and wi-fi control, wherein the ABCXYZ Application requires the GPS coordinates of the user to identify the nearby restaurants. The permissions are displayed to the user on the user's mobile device, as shown in FIG. 3, which depicts a user device displaying one or more permission requests from an application, in accordance with embodiments of the present invention. The user does not want to provide access to the user's current location, but would like to receive meal suggestions and the detailed recipes from ABCXYZ Application. The user likes the idea of being able to take pictures of the meals prepared by the user and upload the pictures without the user's contacts being notified, but only over wi-fi. Thus, the user decides to "deny" GPS data, "allow" camera functionality, "simulate" contacts data, and "deny" control on/off of the user's wi-fi connection, as depicted in FIG. 3.

Figure 4:
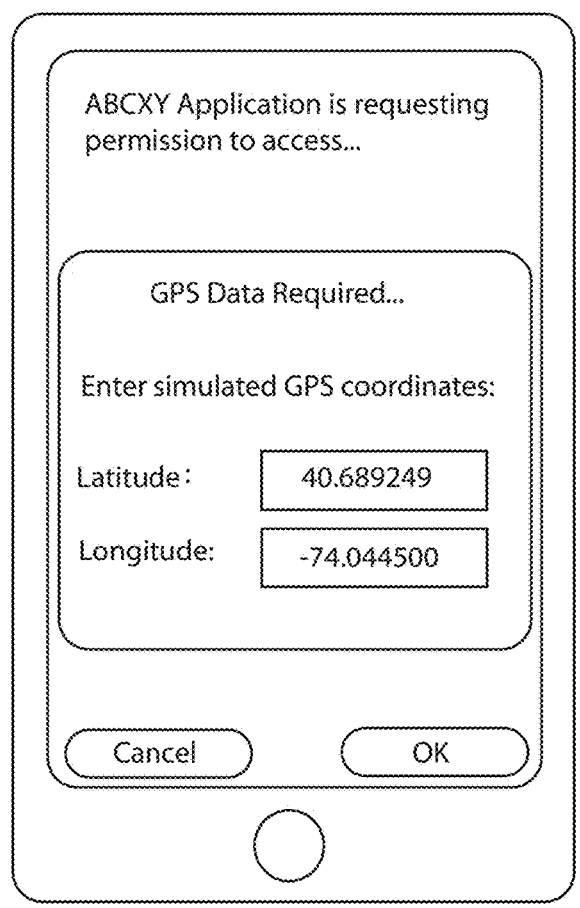
FIG. 4 depicts a user device displaying simulated data being entered to satisfy a required application permission, in accordance with embodiments of the present invention.

Because the user denied permission to obtain the user's GPS data, and the ABCXYZ Application requires the GPS data, the user is prompted to enter spoofed GPS coordinates that are supplied to the ABCXYZ Application, as shown in FIG. 4, which depicts a user device displaying simulated data being entered to satisfy a required application permission, in accordance with embodiments of the present invention. The user enters the GPS coordinates for the Statue of Liberty as the GPS coordinates requested by the application, as shown FIG. 4, wherein the GPS coordinates for the Statue of Liberty do not relate to the position of the user. The ABCXYZ Application accepts the spoofed GPS coordinates of the user, and begins suggesting dinner ideas based on a lack of restaurants nearby the Statute of Liberty serving that kind of food, while the user benefits from the detailed recipes provided with the dinner suggestions.

Accordingly, embodiments of method 200 may selectively process application permission requests wherein the user can benefit from the application but also deny permissions to obtain certain, user-related information.

Figure 5:
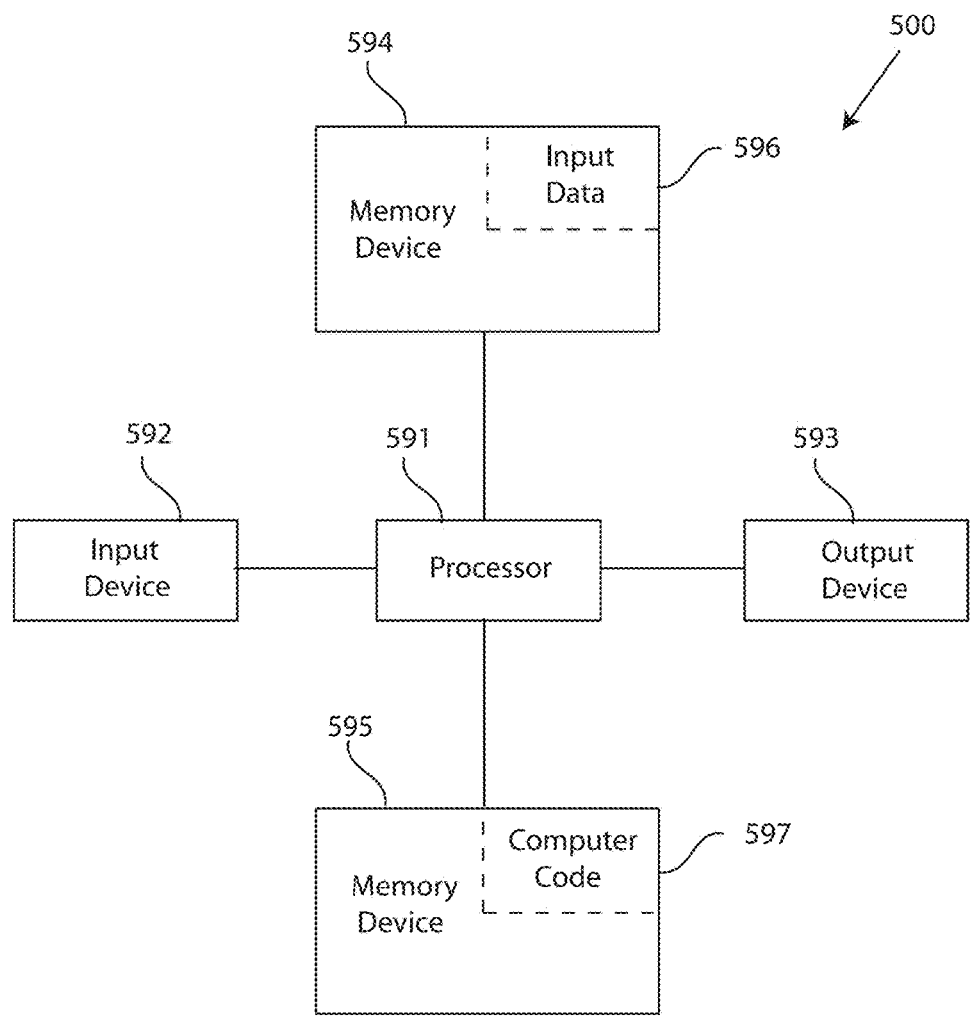
FIG. 5 illustrates a block diagram of a computer system for the application permissions processing system of FIG. 1, capable of implementing methods for processing application permissions of FIG. 2, in accordance with embodiments of the present disclosure.

FIG. 5 illustrates a block diagram of a computer system 500 that may be included in the system of FIG. 1 and for implementing the methods of FIG. 2 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for processing application permissions, in the manner prescribed by the embodiments of FIGS. 2-4 using the selective application permissions processing system of FIG. 1, wherein the instructions of the computer code 597 may be executed by processor 591 via memory device 595. The computer code 597 may include software or program instructions that may implement one or more algorithms for implementing the methods of processing application permissions, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a mobile device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to calendar processing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to manage application permissions. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of processing application permissions. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for processing application permissions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for processing application permission requests, the method comprising:
   detecting, by a processor of a computing system, that an application has been downloaded to the computing system;
   establishing, by the processor, a data exchange between the application and a gateway interface of the computing system to prevent a data exchange between an operating system of the computing device and the application, by at least one of intercepting and overriding APIs of the application, in response to the application being downloaded to the computing system;
   receiving, by the processor, one or more permission requests from the application for resources located on the computing system;
   determining, by the processor, that at least one of the one or more permission requests is a required permission of the application;
   prompting, by the processor, the user to decide the one or more permission requests;
   receiving, by the processor, a denial of the required permission from the user, in response to the prompting;
   responding, by the processor, to the application by providing spoofed resources to the application to satisfy the required permission of the application;
   generating, by the processor, one or more templates of simulated spoofed resources over time based on a learning algorithm that analyzes historical responses of spoofed resources to required permissions; and
   storing, by the processor, the one or more templates for automatically simulating spoofed resources to satisfy the required permissions of subsequent applications downloaded to the computing system.

2. The method of claim 1, wherein the resources of the computing system include at least one of user data, device hardware, and a combination thereof.

3. The method of claim 1, wherein one or more requests for resources includes a permission to access the resources.

4. The method of claim 1, wherein the spoofed resources are supplied by the user.

5. The method of claim 1, wherein the spoofed resources are automatically simulated and transmitted, by the processor.

6. The method of claim 1, wherein the spoofed resources are unrelated to the user.

7. The method of claim 1, wherein the application accepts the spoofed resources as genuine resources of the computing system.

8. A computer system, comprising:
   a processor;
   a memory device coupled to the processor; and
   a computer readable storage device coupled to the processor, wherein the story device contains program code executable by the processor via the memory device to implement a method for processing application permission requests, the method comprising:
   detecting, by a processor of a computing system, that an application has been downloaded to the computing system;
   establishing, by the processor, a data exchange between the application and a gateway interface of the computing system to prevent a data exchange between an operating system of the computing device and the application, by at least one of intercepting and overriding APIs of the application, in response to the application being downloaded to the computing system;
   receiving, by the processor, one or more permission requests from the application for resources located on the computing system;
   determining, by the processor, that at least one of the one or more permission requests is a required permission of the application;
   prompting, by the processor, the user to decide the one or more permission requests;
   receiving, by the processor, a denial of the required permission from the user, in response to the prompting;
   responding, by the processor, to the application by providing spoofed resources to the application to satisfy the required permission of the application;
   generating, by the processor, one or more templates of simulated spoofed resources over time based on a learning algorithm that analyzes historical responses of spoofed resources to required permissions; and
   storing, by the processor, the one or more templates for automatically simulating spoofed resources to satisfy the required permissions of subsequent applications downloaded to the computing system.

9. The computing system of claim 8, wherein the resources of the computing system include at least one of user data, device hardware, and a combination thereof.

10. The computing system of claim 8, wherein the one or more requests for resources includes a permission to access the resources.

11. The computing system of claim 8, wherein the spoofed resources are supplied by the user.

12. The computing system of claim 8, wherein the s goofed resources are automatically simulated and transmitted, by the processor.

13. The computing system of claim 8, wherein the application accepts the spoofed resources as genuine resources of the computing system.

14. A computer program product, comprising a computer readable hardware storage device storing a computer readable program code, the computer readable program code comprising an algorithm that when executed by a computer processor of a computing system implements a method for processing application permission requests, comprising:
    detecting, by a processor of a computing system, that an application has been downloaded to the computing system;
    establishing, by the processor, a data exchange between the application and a gateway interface of the computing system to prevent a data exchange between an operating system of the computing device and the application, by at least one of intercepting and overriding APIs of the application, in response to the application being downloaded to the computing system;
    receiving, by the processor, one or more permission requests from the application for resources located on the computing system;
    determining, by the processor, that at least one of the one or more permission requests is a required permission of the application;
    prompting, by the processor, the user to decide the one or more permission requests;
    receiving, by the processor, a denial of the required permission from the user, in response to the prompting;
    responding, by the processor, to the application by providing spoofed resources to the application to satisfy the required permission of the application;
    generating, by the processor, one or more templates of simulated spoofed resources over time based on a learning algorithm that analyzes historical responses of spoofed resources to required permissions; and
    storing, by the processor, the one or more templates for automatically simulating spoofed resources to satisfy the required permissions of subsequent applications downloaded to the computing system.

15. The computer program product of claim 14, wherein the resources of the computing system include at least one of user data, device hardware, and a combination thereof.

16. The computer program product of claim 14, wherein the one or more requests for resources includes a permission to access the resources.

17. The computer program product of claim 14, wherein the application accepts the spoofed resources as genuine resources of the computing system.

* * * * *